(12) United States Patent
Brüggemann et al.

(10) Patent No.: US 7,066,040 B2
(45) Date of Patent: Jun. 27, 2006

(54) TEST BED COMPRISING ELASTIC CONNECTOR ELEMENTS FOR HELICOPTER GEARBOXES

(75) Inventors: Detlef Brüggemann, Ahnatal (DE); Hubertus Hüser, Büren (DE); Willy Gerd Fischer, Ahnatal (DE)

(73) Assignee: ZF Luftfahrttechnik GmbH, Calden (DE)

( * ) Notice: Subject to any disclaimer, the term of this patent is extended or adjusted under 35 U.S.C. 154(b) by 202 days.

(21) Appl. No.: 10/481,873

(22) PCT Filed: Jul. 18, 2002

(86) PCT No.: PCT/EP02/07981

§ 371 (c)(1),
(2), (4) Date: Dec. 22, 2003

(87) PCT Pub. No.: WO03/010504

PCT Pub. Date: Feb. 6, 2003

(65) Prior Publication Data

US 2004/0154416 A1    Aug. 12, 2004

(30) Foreign Application Priority Data

Jul. 24, 2001    (DE) ................................ 101 35 976

(51) Int. Cl.
*G01M 13/02*    (2006.01)

(52) U.S. Cl. ................ 73/865.9; 73/162; 73/847

(58) Field of Classification Search ............ 73/865.9, 73/118.1, 162, 788, 847, 856, 860
See application file for complete search history.

(56) References Cited

U.S. PATENT DOCUMENTS

| 3,094,867 | A | * | 6/1963 | Hart, Jr. ................... 73/162 |
| 3,207,226 | A | | 9/1965 | Caldwell ............... 170/135.75 |
| 3,460,405 | A | | 8/1969 | Simmons ................... 74/801 |
| 4,159,642 | A | * | 7/1979 | Hudson et al. ........... 73/118.1 |
| 4,395,904 | A | * | 8/1983 | Ivanov et al. ............ 73/118.1 |
| 4,679,464 | A | | 7/1987 | Castellani ................. 74/788 |
| 4,898,026 | A | | 2/1990 | Damitz .................... 73/118.1 |
| 5,906,254 | A | | 5/1999 | Schmidt et al. ............ 188/378 |
| 6,047,596 | A | | 4/2000 | Krug et al. ................ 73/162 |
| 6,393,904 | B1 | | 5/2002 | Krug et al. .............. 73/118.1 |

FOREIGN PATENT DOCUMENTS

| DE | 198 22 093 A1 | | 11/1999 |
| EP | 0 542 453 A1 | | 5/1993 |
| FR | 2 558 552 | | 7/1985 |
| RU | 766524 C | * | 7/1994 |
| SU | 1107243 A | * | 8/1984 |
| SU | 1539945 A | * | 1/1990 |
| WO | 88/04417 | | 6/1988 |
| WO | 97/41415 | | 11/1997 |

* cited by examiner

*Primary Examiner*—Thomas P. Noland
(74) *Attorney, Agent, or Firm*—Davis & Bujold, P.L.L.C.

(57) ABSTRACT

A testing stand for a helicopter transmission is arranged in a testing stand (20) capable of swiveling deflection around a rotor shaft (4) with one output side rotor shaft (4) and at least one drive side input shaft (6, 8). Actuators (28, 30) are provided around the rotor shaft axis (4) for swiveling deflection of the helicopter transmission (2) to equalize shifts on connection couplings (14, 16, 22) occurring under load. It is suggested that the helicopter transmission (2) be clampable in the testing stand (20) by connection elements (24, 26) elastic with respectable to swiveling deflection.

7 Claims, 1 Drawing Sheet ions at torque reductions to various outputs,
TEST BED COMPRISING ELASTIC CONNECTOR ELEMENTS FOR HELICOPTER GEARBOXES This application is a national stage completion of PCT/EP02/07981 filed Jul. 18, 2002 which claims priority from German Application Serial No. 101 35 976.4 filed Jul. 24, 2001.

FIELD OF THE INVENTION

The invention concerns a testing stand for helicopter transmissions.

BACKGROUND OF THE INVENTION

Helicopter transmissions branch drive outputs of one to three drive machines at torque reductions to various outputs, such as main rotor, tail rotor and auxiliary outputs. These specifically highly stressed transmissions are constructed small and light in accordance with the demands in air travel. The transmission housings are chiefly made of aluminum and magnesium alloys. The elasticity modules of these materials lie at one half to one third of the elasticity module of steel alloys. That is, the elastic deformations lie correspondingly higher under load. In particular, a twisting of the transmission housing occurs about the rotor shaft axis.

As a consequence, inputs and outputs that are arranged at a radial distance from the rotor shaft axis on the transmission shift out of their original position. Distortions and radial shifts occur on the axes of the inputs and outputs of the transmissions in relation to the axes of connectable shafts which lead to the drive machines or to the tail rotor output.

A portion of the shifts is equalized by torsionally rigid, angularly mobile disc or membrane clutches. A considerable portion of the shifts is nonetheless equalized by the as a rule very long connection shaft to the drive machines or to the tail rotor output.

For testing a helicopter transmission on a testing stand, the installation situation of the helicopter transmission in the helicopter airframe is largely simulated. Nonetheless, basically shorter drive and output shafts are used in testing stand construction for reasons of space. A greater part of the shifts must be equalized by the clutch elements owing to the shorter shafts. In addition to a basically higher load on the clutch elements due to the greater angles, essentially higher bearing stresses also occur in a radial direction on the inputs and outputs of the helicopter transmissions. The high loads at simultaneously very high rotational speeds up to approximately 25,000/min. can lead to breakage of the clutch elements and to damage in the bearing region of the input and output shafts and on the highly sensitive free wheelings of the helicopter transmissions. Very high stresses upon the components of the testing stand result from this which go beyond the operating loads in the helicopter and, in the worst case, can cause preliminary damage to the transmission.

DE 198 22 093 A1 discloses a testing stand for helicopter transmissions in which a clamping plate that can be rotated by at least one actuator about the rotor shaft axis of the test transmission is provided for accommodating the helicopter transmission. The actuators are activated in a load-dependent manner to compensate for shifts arising under load on the connection clutches of the helicopter transmission.

The clamping plate and its bearing are nonetheless relatively expensive. The invention is, therefore, based upon indicating a more economical suspension of the test transmission with which an equalization of shifting is nonetheless possible.

SUMMARY OF THE INVENTION

This objective is accomplished in that the helicopter transmission can be clamped using elastic connection elements with reference to the swiveling deflection in the testing stand. Since the necessary angle shifts are only a few degrees, a sufficiently large amount of swiveling deflection is already made possible through the elastic swiveling elements.

In an advantageous refinement of the invention, the testing stand has a central connection member beneath the helicopter transmission from which at least two elastic connection elements extend radially outward on the outer ends of which an actuator is respectively articulated, and on the outer ends of which moreover fastening points for accommodating the helicopter transmission are situated. Since the elasticity is only desired in the direction of the swiveling deflection, but otherwise the connection elements should be suited to accommodate forces without deformation, it is advantageous if the elastic connection elements have a high elasticity solely with regard to the swiveling deflection.

BRIEF DESCRIPTION OF THE DRAWINGS

The invention will now be described, by way of example, with reference to the accompanying drawings in which.

DETAILED DESCRIPTION OF THE INVENTION

Figure 1:
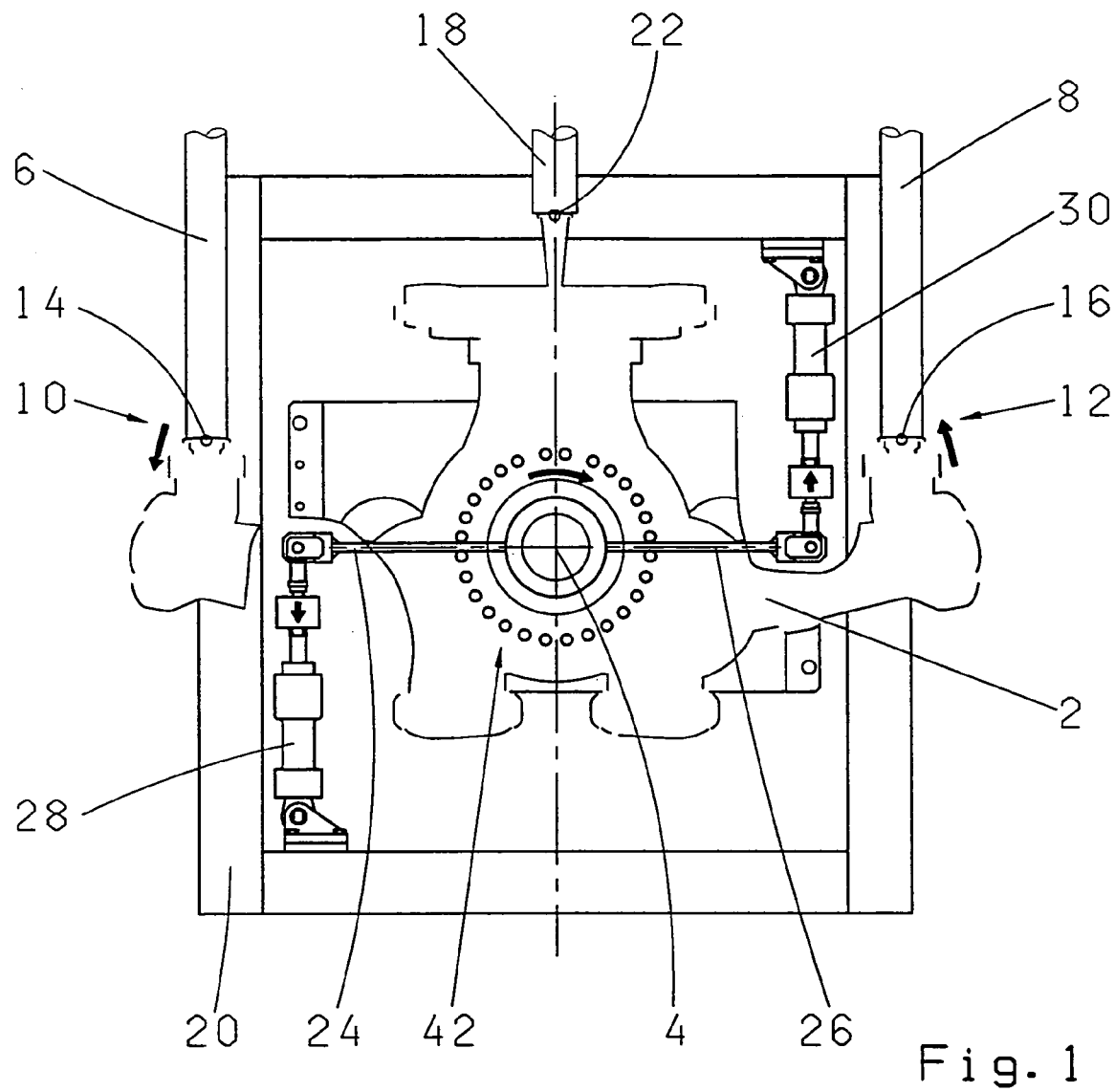
FIG. 1 illustrates a schematic plan view.

The helicopter transmission to be tested is designated with 2 in FIG. 1, a rotor shaft axis 4 runs perpendicular to the drawing plane. The helicopter transmission 2 has several inputs and outputs. The driving connection shafts to a testing stand are designated with 6 and 8 which are coupled to inputs 10, 12 using connection couplings 14, 16 of the helicopter transmission. The input shafts 6, 8 run, just as the tail rotor output shafts 18, basically on a place orthogonal toward the rotor shaft axis 4.

An installation frame 20 accommodates the transmission. The housing of the helicopter transmission is deformed under load so that harmful angle shifts would arise on connection couplings 14, 16, 22 to the input or output shafts 6, 8, 18. In order to prevent this, the helicopter transmission is arranged in the installation frame 20 of the testing stand swiveling deflectably using elastic connection elements 24, 26, whereby the helicopter transmission is rotated on its suspension about an equalizing angle by actuators 28, 30 in a load-dependent manner so that the angle shifts on the connection couplings 14, 16, 22 are equalized.

Figure 2:
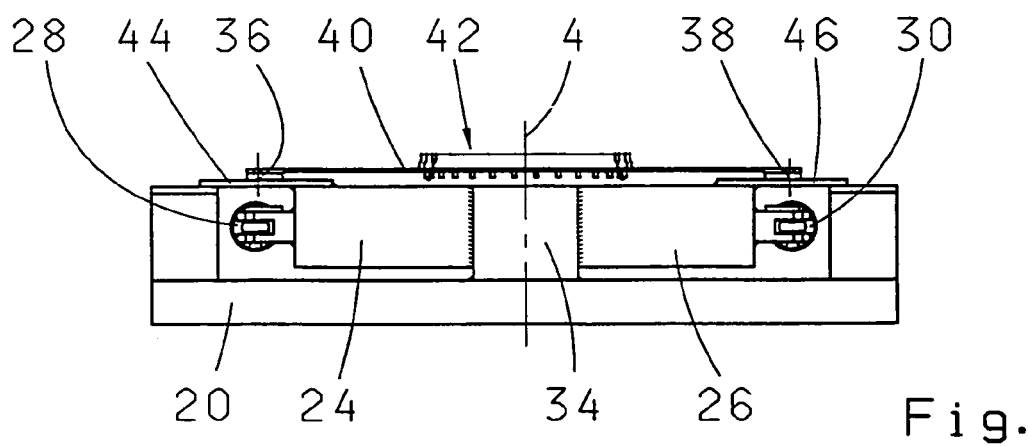
FIG. 2 illustrates an elevational view of the testing stand of the invention.

The manner in which the helicopter transmission is clamped in the installation frame 20 is most apparent on the basis of FIG. 2. The installation frame 20 has a central connection member 34, coaxial in relation to the rotor shaft axis 4, which is rigidly connected with the installation frame 20. The elastic elements 24, 26, constructed as diaphragms, are installed on the central connection member 34. An actuator 28,30 is respectively articulated in the region of the outer end of these elastic connection elements 24, 26. Moreover fastening points 36, 38 are provided in the region of the outer end for accommodating the helicopter transmission.

Of the helicopter transmission, only a so-called torque-reacting plate 40 is illustrated in FIG. 2, which also accommodates the reaction factors of the helicopter transmission housing in the helicopter under load and transmits them to the helicopter airframe or the testing stand. The helicopter transmission housing (not represented in FIG. 2) is fastened to the torque-reacting plate 40 using a circular series of bolts 42.

The elastic elements 24, 26 have a rectangular cross section with less thickness and greater height so that they have a high elasticity only in relation to the swiveling deflection of the helicopter transmission. The fastening sheets 44, 46 installed on the elastic elements 24, 26 have first of all the fastening points 36, 38 for the torque-reacting plate 40 and lie at the same time on the installation frame 20 so that they slide with a swiveling deflection of the installation frame 20 and thereby stabilize the entire device.

REFERENCE NUMERALS 2 helicopter transmission
4 rotor shaft axis
6 shaft
8 shaft
10 input
12 input
14 connection coupling
16 connection coupling
18 shaft
20 installation frame
22 connection coupling
24 elastic connection element
26 elastic connection element
28 actuator
30 actuator
34 central connection member
36 fastening point
38 fastening point
40 torque-reacting plate
42 series of bolts
44 fastening sheet
46 fastening sheet

The invention claimed is:

1. A testing stand for a helicopter transmission (2) having an output side rotor shaft (4) and at least one drive-side input shaft (10, 12), the testing stand is connected to the transmission by shafts (6, 8) and connection couplings (14, 16, 22) with at least one testing stand side shaft connection, whereby the helicopter transmission (2) is capable of swiveling about the output side rotor shaft axis (4), and at least one actuator (28, 30) inhibits swiveling of the helicopter transmission (2) about the output side rotor shaft axis (4) in equalize shifting of the helicopter transmission (2) on the connection couplings (14, 16, 22) occurring under load, and the helicopter transmission (2) is clamped to the testing stand (20) by connection elements (24, 26) which are elastic with relation to swiveling deflection.

2. The testing stand for the helicopter transmission (2) according to claim 1, wherein the testing stand has a central connection member (34), at least two elastic connection elements (24, 26) extend radially outward from the central connection member (34), an outer end of each of the two elastic connection elements (24, 26) respectively has one actuator (28, 30) which is articulated and on which the fastening points (36, 38) for accommodating the helicopter transmission (2) are located.

3. The testing stand for the helicopter transmission (2) according to claim 2, wherein the elastic connection elements (24, 26) have elasticity substantially only in relation to the swiveling deflection of the helicopter transmission (2).

4. A testing stand for a helicopter transmission (2) with an output side rotor shaft (4) and at least one drive-side input shaft (10, 12); wherein at least one testing stand side connection connects the testing stand to the helicopter transmission (2), the testing stand side connection comprises at least one shaft (6, 8) and at least two connection couplings (14, 16, 22), the helicopter transmission (2) is clamped to the testing stand (20) by connection elements (24, 26) which are sufficiently elastic so that the helicopter transmission (2) is capable of swiveling about the output side rotor shaft axis (4) during testing, and at least one actuator (28, 30) inhibits the swiveling in order to equalize shifting of the helicopter transmission (2) on the connection couplings (14, 16, 22).

5. The testing stand for the helicopter transmission (2) according to claim 4, wherein the testing stand has a central connection member (34), at least two elastic connection elements (24, 26) extend radially from the central connection member (34), and each of the elastic connection elements (24, 26) has a remote end which is connectable to the helicopter transmission (2).

6. The testing stand for the helicopter transmission (2) according to claim 5, wherein each of the elastic connection elements (24, 26) is connected to at least one actuator (28, 30) which equalizes angular shift on the connection couplings (14, 16, 22) of the helicopter transmission (2).

7. The testing stand for the helicopter transmission (2) according to claim 5, wherein the elastic connection elements (24, 26) have elasticity substantially only in relation to the swiveling deflection of the helicopter transmission (2).

* * * * *